(12) United States Patent
Delaney

(10) Patent No.: US 6,831,754 B1
(45) Date of Patent: Dec. 14, 2004

(54) SYSTEM FOR SENDING AND PRINTING IMAGES

(75) Inventor: Beth M. P. Delaney, Loveland, CO (US)

(73) Assignee: Hewlett-Packard Development Company, L.P, Houston, TX (US)

(*) Notice: Subject to any disclaimer, the term of this patent is extended or adjusted under 35 U.S.C. 154(b) by 855 days.

(21) Appl. No.: 09/648,052

(22) Filed: Aug. 25, 2000

(51) Int. Cl.[7] .......................... G06F 15/00; H04N 5/225
(52) U.S. Cl. .................... 358/1.15; 715/517; 348/207.1
(58) Field of Search ................................ 358/1.15, 442, 358/402, 296; 348/207.12–207.2, 552, 207.11; 347/2, 23, 5; 715/517; 382/305

(56) References Cited

U.S. PATENT DOCUMENTS 6,141,111 A * 10/2000 Kato ......................... 358/1.15
6,388,759 B1 * 5/2002 Yoshida et al. ............ 358/1.13
6,453,078 B2 * 9/2002 Bubie et al. ................ 382/305

* cited by examiner

Primary Examiner—Kimberly Williams
Assistant Examiner—Saeid Ebrahimi

(57) ABSTRACT

The present disclosure relates to a method for sending digital images to a recipient using a sender printer. The method comprises receiving a digital camera memory card with the printer and sending an image stored within the memory card to the recipient across a network such that a hard copy of the sent image is automatically printed by a recipient device. In a preferred embodiment, the sender printer is Internet-enabled and the image is sent directly from the sender printer to the recipient device. By way of example, the recipient device can also comprise an Internet-enabled printer. In such an embodiment, printer-to-printer sending is possible.

27 Claims, 4 Drawing Sheets

SYSTEM FOR SENDING AND PRINTING IMAGES

FIELD OF THE INVENTION

The present disclosure relates to a system for sending and printing images. More particularly, the present disclosure relates to a system for printer-to-printer remote printing of images.

BACKGROUND OF THE INVENTION

The advent of digital cameras has greatly expanded the options for taking and distributing photographs. As is known in the art, digital cameras are used to take digital images that are, at least temporarily, stored within the camera. Normally, storage is provided with one or more internal memory cards that typically are removable from the camera.

After image data has been stored in camera memory, it can be downloaded to a computing device such as a personal computer (PC). Normally, each image is stored as a separate image file both within the camera and in the computing device once downloaded. When the image files are opened, they normally can be viewed (e.g., on a display device), processed in some manner (e.g., scaled), printed, and/or transmitted to a desired recipient.

With the ever increasing popularity of the Internet, people more and more frequently are sharing digital images electronically. For instance, digital images can be sent as attachments to e-mail messages. Although providing an effective means for sharing images, e-mailing images presents drawbacks. In particular, a relatively large amount of user interface is needed to send and receive images via e-mail. For example, the user normally must enter the e-mail program, call up the desired image or images, select the intended recipient for the image(s), and send them. Once the image or images have been sent to the recipient, the recipient normally must open the e-mail message, save the image file attachment on the recipient's hard drive, and then open it in an appropriate browser program. Moreover, if the recipient wishes to have a hardcopy of the image, he or she typically must manually instruct the program to print the image(s). This process can be time consuming, particularly where the image files are large.

It would be desirable to have a system for sending and printing images which is highly automated so as to reduce the amount of user intervention required.

SUMMARY OF THE INVENTION

The present disclosure relates to a method for sending digital images to a recipient using a sender printer. The method comprises receiving a digital camera memory card with the printer and sending an image stored within the memory card to the recipient across a network such that a hard copy of the sent image is automatically printed by a recipient device. In a preferred embodiment, the sender printer is Internet-enabled and the image is sent directly from the sender printer to the recipient device. By way of example, the recipient device can also comprise an Internet-enabled printer. In such an embodiment, printer-to-printer sending is possible.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
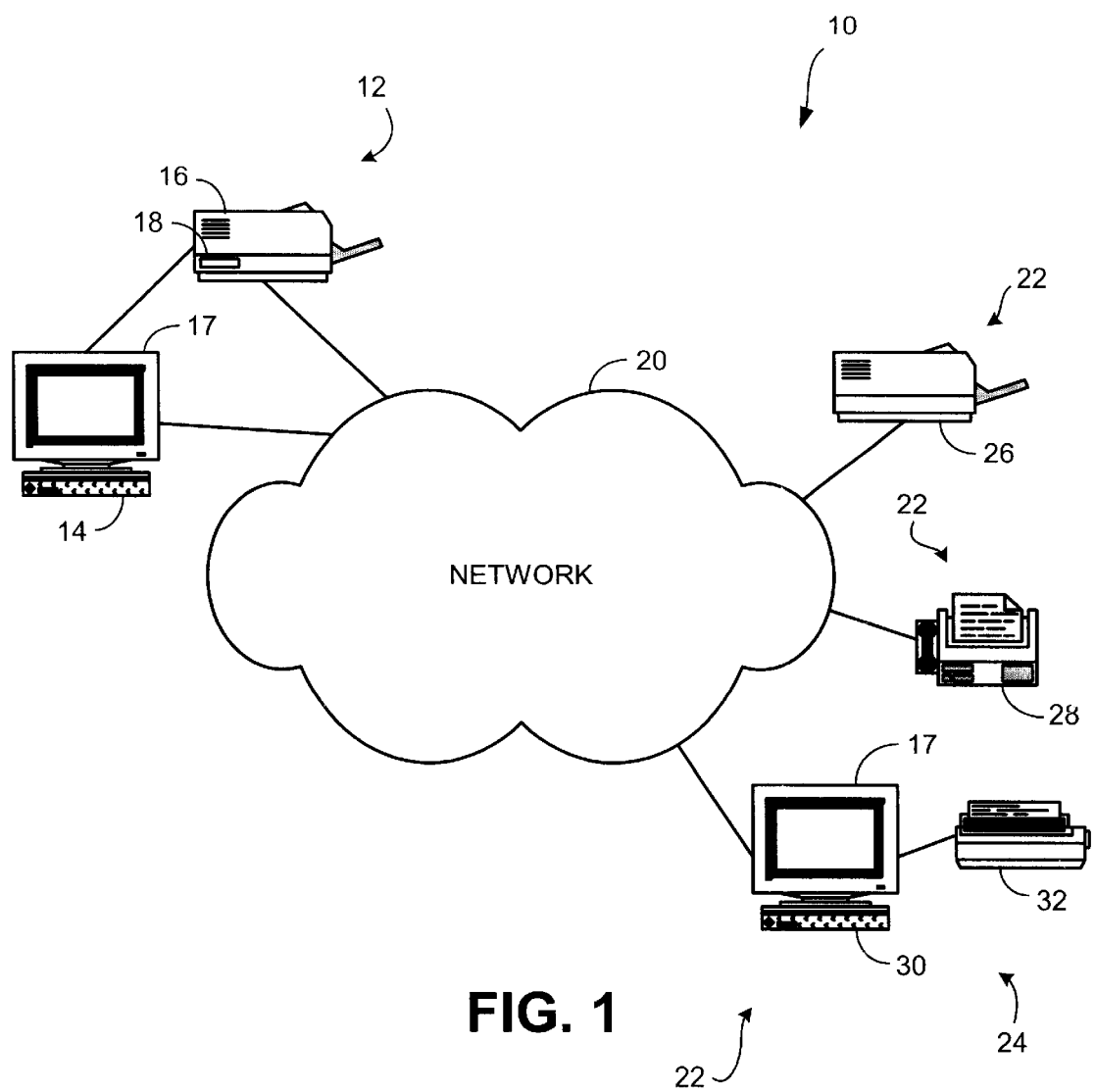
FIG. 1 is a schematic of a network system over which images can be sent and printed with the present invention.

Referring now in more detail to the drawings, in which like numerals indicate corresponding parts throughout the several views, FIG. 1 illustrates a network system 10 with which images can be sent and printed with the present invention. As identified in FIG. 1, the system 10 can comprise a first computing system 12 that is used by the sender. By way of example, the computing system 12 includes a computing device 14 and a printer 16. Normally, the computing device 14 comprises a PC which includes a central processing unit (CPU) and memory (not shown), and a display 17. The printer 16 preferably is Internet-enabled and includes a memory card slot 18 that is adapted to receive standard memory cards conventionally used in digital cameras.

Further included in the network system 10 is a network 20 over which the image files can be transmitted. Typically, the network 20 comprises the Internet, although other types of networks could be used. For instance, the network 20 alternatively can comprise an intranet, ethernet, and the like. In a preferred arrangement, both the computing device 14 and the printer 16 of the first computing device 12 are independently connected to the network 20. As will be understood from the discussion that follows, such an arrangement permits image files to be sent directly from the sender's computing device 14 or from the sender's printer 16 to an appropriate recipient device.

The network system 10 further includes at least one recipient device 22 with which the image files transmitted from the first computing system 12 can be received. By way of example, these recipient devices 22 can comprise a second computing system 24, an Internet-enabled printer 26, or a facsimile machine 28. Normally, the second computing system 24 comprises a computing device 30 (e.g., a PC) and a printer 32. As will be understood by persons having ordinary skill in the art, where the recipient device 22 comprises an Internet-enabled printer 26, information transmitted across the network 20 to the printer 26 can be printed out directly without instructions from a separate computing device.

Figure 2:
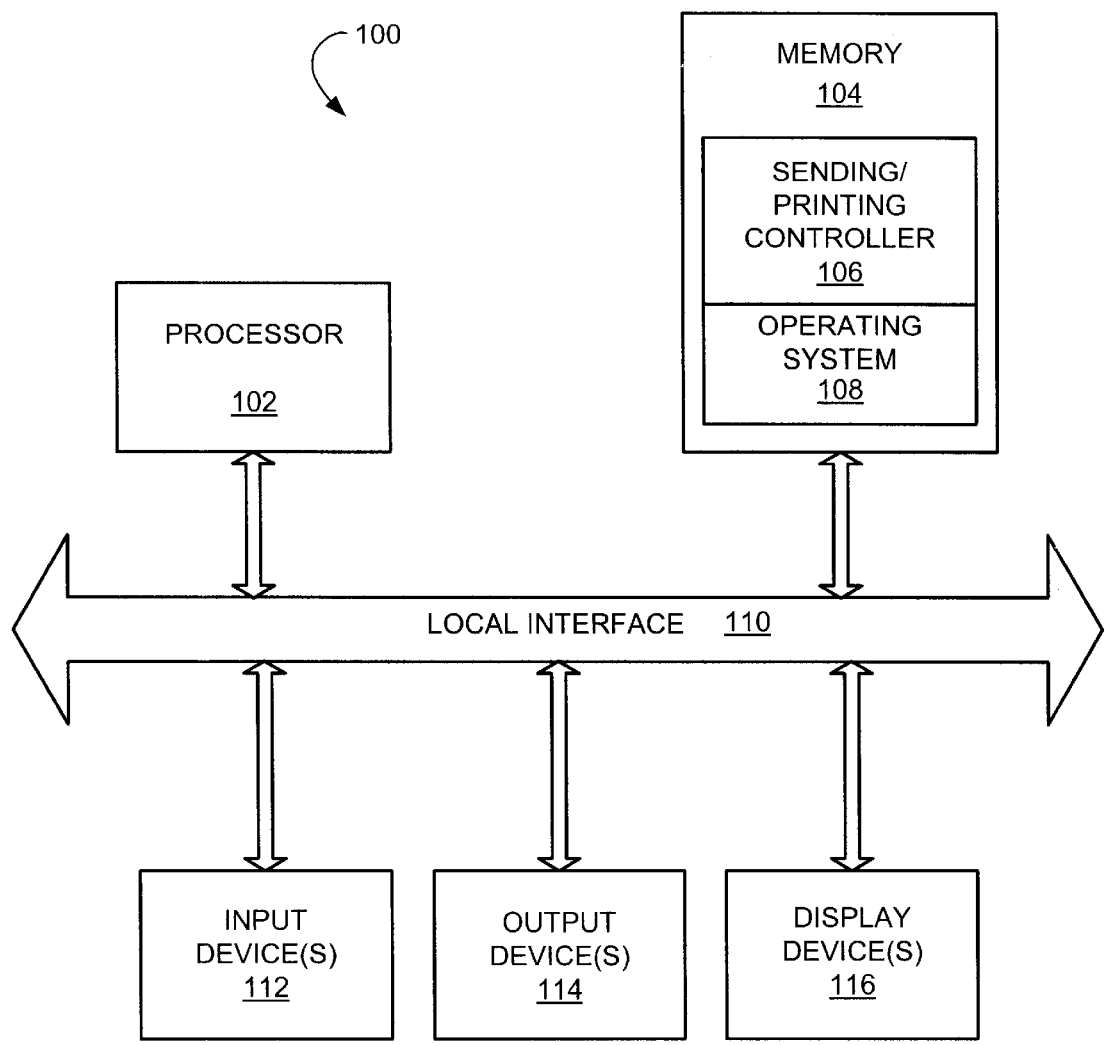
FIG. 2 is a functional block diagram of an image sending and printing system of the present invention.

FIG. 2 illustrates a functional block diagram of a sending and printing system 100. As will be understood from the following discussion, this sending and printing system 100 can form part of the computing device 14 or the printer 16, or a combination thereof. Preferably, however, the system 100 is wholly or at least partially contained within the printer 16 to simplify the sending and printing process.

As indicated in FIG. 2, the sending and printing system 100 generally comprises a processor 102, a memory 104, a local interface 110, an input device 112, an output device 114, and a display device 116. Depending upon the configuration used, the processor 102 can comprise a CPU that forms part of the computing device 14 or the printer 16 shown in FIG. 1. Similarly, the memory 104 can comprise a hard drive of the computing device 14 or, alternatively, can comprise a similar memory device that is provided within the printer 16. Where the processing steps are to be executed by the computing device 14, the input device 112 can comprise, for instance, a keyboard and/or a mouse with which the commands of the sender can be input. In such an embodiment, the display device 116 can comprise the display 17 of the computing device 14 (FIG. 1). Where the processing steps are to be executed by the printer 16, the input device 112 can comprise one or more input keys (not shown) of the printer. In such an embodiment, the display device 116 can comprise a liquid crystal display (LCD) (not shown) provided on the printer 16.

Irrespective of the location of the memory 104, this memory includes a sending/printing controller 106 and an operating system 108. As its name suggests, the sending/printing controller 106 is used to control sending and printing of image files. In particular, this controller 106 is used to send image files from the sender computing system 12 shown in FIG. 1 across the network 20 to one or more of the recipient devices 22.

Figure 3:
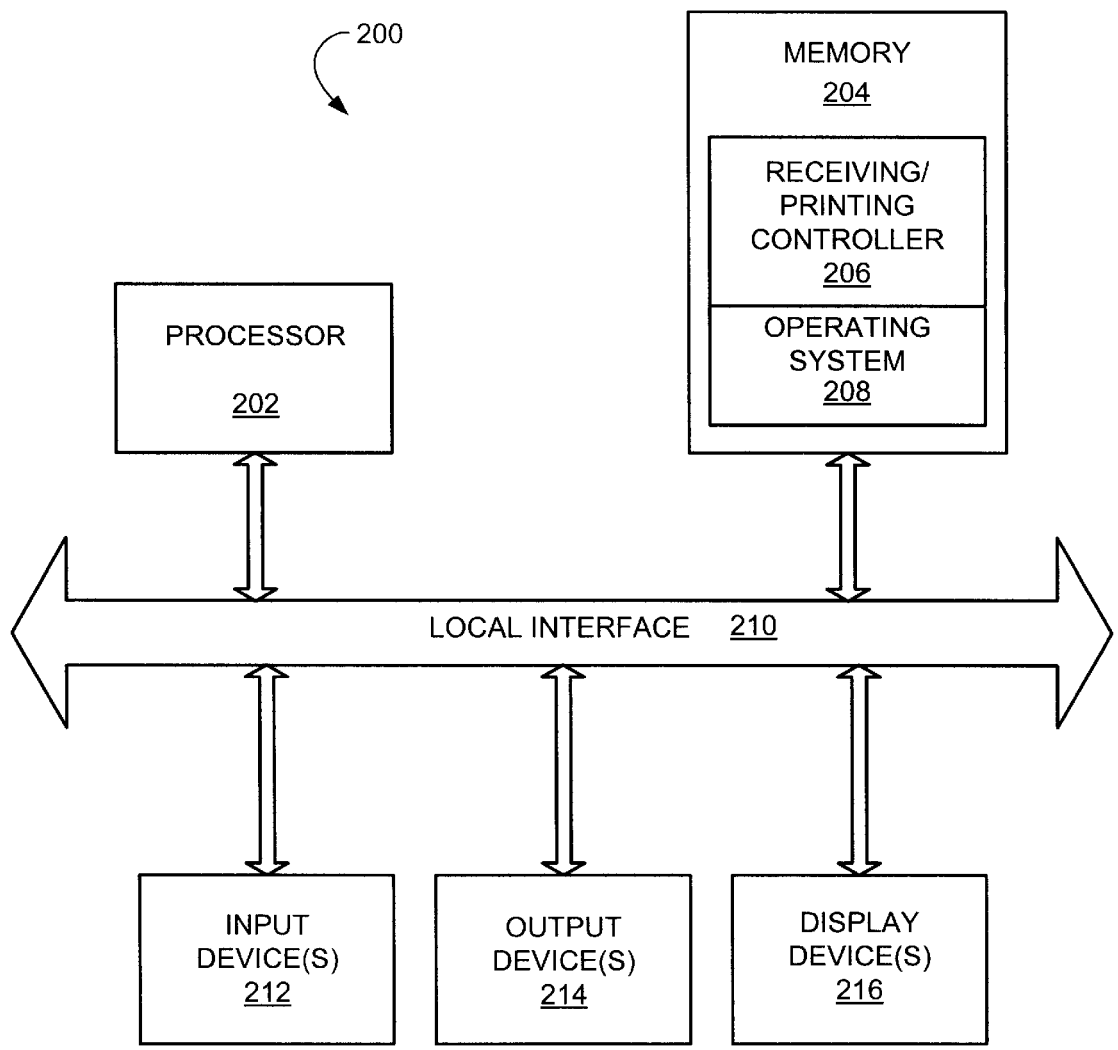
FIG. 3 is a functional block diagram of an image receiving and printing system of the present invention.

FIG. 3 illustrates a functional block diagram of a receiving and printing system 200. As will be understood from the following discussion, this receiving and printing system 200 can comprise a recipient device 22 such as those shown in FIG. 1. As indicated in FIG. 3, the receiving and printing system 200 generally comprises a processor 202, a memory 204, a local interface 210, an input device 212, an output device 214, and a display device 216. The memory 204 can comprise a hard drive or RAM of the recipient device 22. Where the recipient device 22 is a computing system 24, the input device 212 can comprise, for instance, a keyboard and/or a mouse with which the commands of the sender can be input, and the display device 214 can comprise a display 17. Where the recipient device 22 is an Internet-enabled printer 26 or a facsimile machine 28, the input device 212 can comprise one or more input keys and the display device 216 can comprise a liquid crystal display (LCD). In any case, the output device normally comprises a printer or printing mechanism.

The memory 204 of the receiving and printing system 200 includes a receiving/printing controller 206 and an operating system 208. As its name suggests, the receiving/printing controller 206 is used to control receiving and printing of image files. In particular, this controller 206 is used to receive image files from the sender computing system 12 shown in FIG. 1 and print hard copies of the images.

As will be appreciated by persons having ordinary skill in the art, the sending/printing controller 106 and the receiving/printing controller 206 can be implemented in software, hardware, or a combination thereof. Most preferably, however, the controllers comprise one or more software programs. It is to be noted that, when implemented in software, the controllers can be stored and transported on any computer readable medium for use by or in connection with an instruction execution system, apparatus, or device, such that a computer-based system, processor containing system, or other system can fetch the instructions from the instruction execution system, apparatus, or device and execute the instructions.

In the context of this disclosure, a "computer readable medium" can be a means that can contain, store, communicate, propagate, or transport the program for use by or in connection with the instruction execution system, apparatus or device. A compute readable medium can be, for example, an electronic, magnetic, optical, electromagnetic, infrared, or semiconductor system, apparatus, device, or propagation medium. More specific examples of compute readable media include the following: an electrical connection having one or more wires, camera memory card, affordable computer diskette, a random access memory (RAM), a read only memory (ROM), an erasable programmable read only memory (EPROM or Flash memory), an optical fiber, and a portable compact disk read only memory (CD ROM). It is to be noted that the computer readable medium can even be paper or another suitable medium upon which the program is printed as the program can be electronically captured, via for instance optical scanning of the paper or other medium, then compiled, interpreted, or otherwise processed in a suitable manner if necessary, and then stored in a computer memory.

Figure 4:
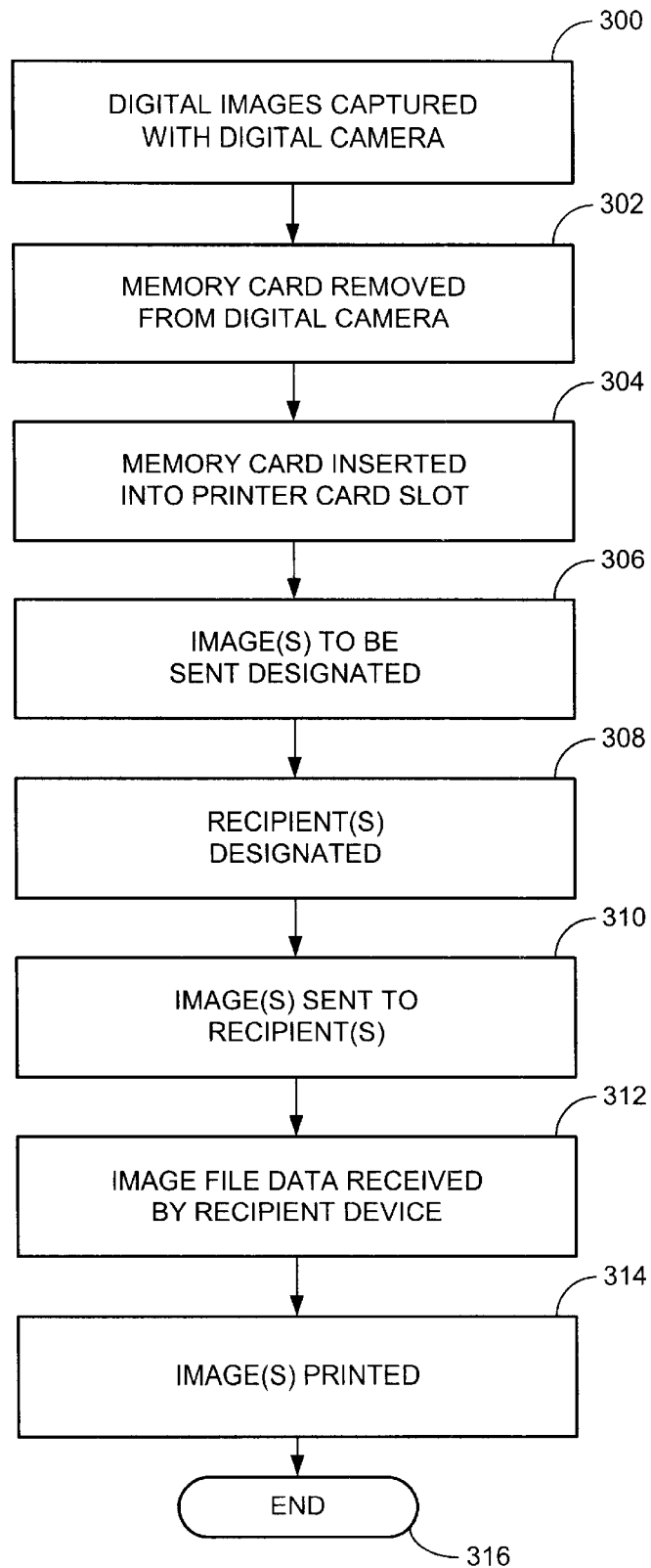
FIG. 4 is a flow diagram of an example method for sending and printing images of the present invention.

FIG. 4 illustrates a flow diagram of a method for sending and printing digital images of the present invention. As indicated in block 300, the user first takes digital images with a digital camera to form one or more image files that are saved within camera memory. As described above, these image files normally are stored in a removable memory card. Once the various images have been taken with the camera, the user can remove the memory card from the camera, as indicated in block 302, and insert it into the memory card slot 18 of the printer 16 (FIG. 1) as indicated in block 304. After the memory card has been inserted into the memory card slot 18, the user can designate the image or images to be sent to one or more recipients, as identified in block 306. Where the sending and printing system 100 is comprised within the computing device 14, the user normally selects the image or images to be sent with the keyboard and/or mouse of the computing device 14. By way of example, this selection can be accomplished using appropriate software with which the various images stored on the memory card can be viewed on the display 17. In such a scenario, selection can comprise simply "dragging and dropping" the desired images to a field identified on the display 17, or by "double clicking" on the intended images.

Where the sending and printing system 100 is embodied within the printer 16, selection of the image(s) can be accomplished with the input keys and display of the printer. Alternatively, in a simplified embodiment, each of the image files stored on the memory card are automatically "selected" by insertion of the memory card into the printer's memory card slot 18. In such an arrangement, each of the image files is transmitted to the recipient when the memory card is inserted in the slot 18.

Once the various image files have been designated, the user can select the intended recipients of the images as indicated in block 308. Where the sending and printing system 100 is comprised within the computing device 14, this step can comprise identifying the relevant recipient information in a recipient field shown on the display 17. This can involve entry of an e-mail address for the recipient, or the recipient can be selected from a list of possible recipients displayed to the user. Alternatively, where the sending and printing system 100 is contained within the printer 16, selection of the recipient can be had in similar manner by selecting the desired recipient from a list of possible recipients with the input keys.

After the recipients have been selected, the various image files are sent to these recipients as indicated at block 310. Sending of the image files to the recipients can be initiated by, for instance, selecting "send" with the computing device 14 or by depressing a send key (not shown) provided on the printer 16. Irrespective of the manner in which the sending process is initiated, the various image files are transmitted across the network 20 and are received by the appropriate recipient device 22 as indicated in block 312. As described above, this device 22 can comprise a computing system 24, an Internet-enabled printer 26, or a facsimile machine 28. Where the recipient device 22 comprises a computing system 24, the image file data is transmitted to the computing device 30 which receives the data and preferably automatically sends the data to its associated printer 32 to print a hardcopy of each image sent to the recipient (block 314). Operating in this manner, the recipient need not manually save, open, and print the image files as is conventionally required when images are e-mailed to the recipient. In one embodiment, the data transmitted to the computing device 30 include commands that instruct the computing device 30 to automatically print the images from the files. In an alternative embodiment, the computing device 30 is provided with appropriate software that recognizes the incoming image files and, upon such recognition, automatically causes the image data to be printed. Optionally, the image data can be automatically stored within the recipient computing device memory so that the recipient will be provided with an electronic copy of the image files.

In a preferred embodiment, the recipient device 22 comprises an Internet-enabled printer 26. In such an arrangement, the image files are sent directly to the printer 26 such that the printer 26 automatically prints the images without the need for a computing device or action on the part of the recipient. Again, the instructions to print the image can come from the image file data or can be provided by appropriate software stored within printer memory. As with the previously described embodiment, the image data can be automatically saved to provide the recipient with an electronic copy of the image files. In a preferred arrangement, the image data is transmitted from the printer 16 to a connected computing device (not shown), such as a PC, so that the data is stored in computing device memory.

In an alternative arrangement, the recipient device 22 comprises a facsimile machine 28. In such an embodiment, the image data is again automatically be printed in similar manner to that described above.

Once the images have been printed by the recipient device 22, flow is terminated as indicated at 316. At this point, the recipient device 22 can await further incoming image data for printing.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for sending digital images to a recipient using a sender printer, comprising:
   receiving a digital camera memory card with the sender printer, the sender printer being Internet-enabled; and
   sending an image stored within the memory card to the recipient across a network, the network comprising the Internet, such that a hardcopy of the sent image is automatically printed by a recipient printer.

2. The method of claim 1, wherein the image is sent directly from the sender printer to the recipient printer.

3. The method of claim 1, wherein the sender printer is connected to a sender computing device and the sender computing device sends the image to the recipient printer.

4. The method of claim 1, wherein the recipient printer is an Internet-enabled printer.

5. The method of claim 1, wherein the recipient comprises a recipient computing device connected to the recipient printer, and the image is sent to the recipient computing device such that a hardcopy of the sent image is automatically printed by the recipient printer.

6. The method of claim 1, further comprising receiving an image designation to select the image to be sent.

7. The method of claim 1, further comprising receiving a recipient designation to select the recipient to which the image is to be sent.

8. A system for sending digital images to a recipient, comprising:
   means for receiving a digital camera memory card with a sender printer; and
   means for sending an image stored within the memory card to the recipient across a network, the network comprising the Internet, such that a hardcopy of the sent image is automatically printed by a recipient printer;
   wherein the sender printer is Internet-enabled and also is configured to automatically print a hard copy of an image received via the network.

9. The system of claim 8, wherein the means for sending sends the image directly from the sender printer to the recipient printer.

10. The system of claim 8, wherein the means for sending sends the image from a sender computing device connected to the sender printer.

11. The system of claim 8, wherein the means for sending sends the image directly to the recipient printer.

12. The system of claim 8, wherein the means for sending sends the image directly to a recipient computing device, the recipient computing device being connected to the recipient printer such that a hardcopy of the sent image is automatically printed by the recipient printer in response to the image being sent to the recipient computing device.

13. The system of claim 8, further comprising means for receiving an image designation to select the image to be sent.

14. The system of claim 8, further comprising means for receiving a recipient designation to select the recipient to which the image is to be sent.

15. A system for sending digital images to a recipient including a computer readable medium, comprising:
   logic configured to receive a digital camera memory card with a sender printer, the sender printer being Internet-enabled; and
   logic configured to send an image stored within the memory card to the recipient across a network, the network comprising the Internet, such that a hardcopy of the sent image is automatically printed by a recipient printer;
   wherein the sender printer also is configured to automatically print a hard copy of an image received via the network.

16. The system of claim 15, wherein the logic configured to send sends the image directly from the sender printer to the recipient printer.

17. The system of claim 15, wherein the logic configured to send sends the image from a sender computing device connected to the sender printer.

18. The system of claim 17, wherein the logic configured to send sends the image directly to a recipient printer.

19. The system of claim 15, wherein the logic configured to send sends the image directly to a recipient computing device.

20. The system of claim 15, further comprising logic configured to receive an image designation to select the image to be sent.

21. The system of claim 15, further comprising logic configured to receive a recipient designation to select the recipient to which the image is to be sent.

22. A system for receiving and printing digital images from a sender, comprising:

means for receiving an image file from a sender device, the means for receiving being located in a recipient computing device; and means for automatically printing a hardcopy of the image stored in the image file, the means for automatically printing being located in a recipient printer such that, in response to the recipient computing device receiving the image file, the recipient computing device communicates with the recipient print to enable the recipient printer to print the hardcopy automatically.

23. The system of claim 22, wherein the means for receiving comprises software stored in an Internet-enabled printer.

24. The system of claim 22, further comprising:

a sender device, wherein the sender device comprises an Internet-enabled printer.

25. A system for receiving and printing digital images from a sender, comprising:

logic configured to receive an image file from a sender device, the logic configured to receive being located in a recipient computing device; and logic configured to automatically print a hardcopy of the image stored in the image file, the logic configured to automatically print being located in a recipient printer such that, in response to the recipient computing device receiving the image file, the recipient computing device communicates with the recipient print to enable the recipient printer to print the hardcopy automatically.

26. The system of claim 25, wherein the logic configured to receive is stored within an Internet-enabled printer.

27. The system of claim 25, wherein the sender device comprises an Internet-enabled printer.

\* \* \* \* \*